April 14, 1925.
E. L. RIDLER
1,533,141
FLOOR AND CEILING PLATE
Filed March 14, 1922
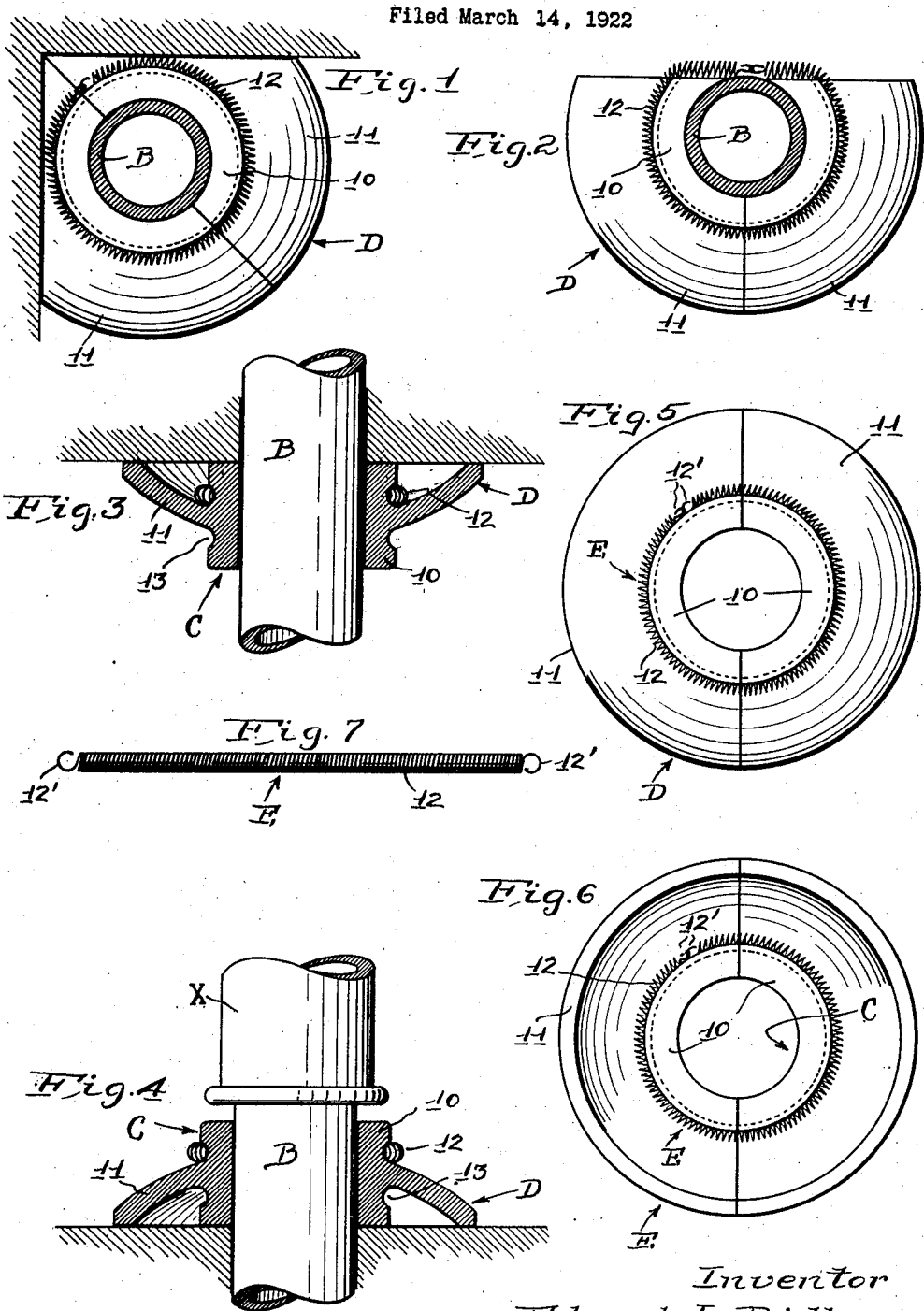
Inventor
Edward L. Ridler
By Bradbury & Caswell
Attorneys Patented Apr. 14, 1925.

1,533,141

UNITED STATES PATENT OFFICE.

EDWARD L. RIDLER, OF ST. PAUL, MINNESOTA.

FLOOR AND CEILING PLATE.

Application filed March 14, 1922. Serial No. 543,809.

*To all whom it may concern:*

Be it known that I, EDWARD L. RIDLER, a citizen of the United States, residing at St. Paul, in the county of Ramsey and State of Minnesota, have invented a new and useful Floor and Ceiling Plate, of which the following is a specification.

This invention relates to improvements in devices known as floor and ceiling plates, which are designed to be used in connection with pipes, bolts, and the like, to hide the cut-out in the ceiling or floor through which said pipe or the like passes.

The invention has for its object to provide a plate of the type mentioned, which can be readily applied to pipes in close quarters, as in corners and close to walls and which shall be ornamental, as well as simple, in construction and efficient in use.

The above and other novel features of the invention will appear from the detailed description thereof taken in connection with the accompanying drawing, forming part of this application.

Referring to the drawing, Fig. 1 is a plan view showing how the plate may be applied to a pipe in a corner; Fig. 2 is a similar view showing how the plate may be applied to a pipe, which is very close to a wall; Fig. 3 is a vertical section through the plate showing the flexible retaining member, as hidden from view, between the flange and ceiling or floor; Fig. 4 is a vertical section through the plate showing how the flexible retaining member may be in exposed position if necessary; Fig. 5 is a plan view of the plate as seen in Fig. 4; Fig. 6 is a plan view of the plate as seen in Fig. 3 and Fig. 7 shows the spring comprising the flexible retaining member.

In the drawing, B designates a pipe around which is placed the novel floor or ceiling plate constituting the subject matter of this invention. The plate comprises a collar or sleeve C having a petticoat or dished flange D thereon. The flange D projects from the sleeve C intermediate the ends thereof and cups the base of said sleeve, said flange forming a cover for the cut-out through which the pipe passes. The plate is divided into segments, each including a sleeve section 10 and a flange section 11. These segments are confined in place about the pipe in yielding, gripping engagement therewith by means of an endless, flexible retaining member E preferably comprising a coil spring 12 having hooks 12' at its ends to permit ready coupling. The spring may encircle the sleeve C at either side of the root of the flange D in external grooves 13, but ordinarily it will be located in the groove 13 at the base of the plate, as shown in Fig. 3, so as to be housed over by the flange D and concealed from view. Sometimes, however, there may not be sufficient clear space on the pipe to permit the spring 12 to be placed at the base of the plate. An obstruction, such as a coupling or fitting X may necessitate placing the spring 12 on the outer end of the sleeve, as in Fig. 4. The reason for this will become apparent when it is explained that the spring is applied to the sleeve by rolling and stretching the same over an end thereof until it finds its seat in a groove 13, at the root of the flange D. If there is not enough room to unite the ends of the spring 12 around the pipe and roll it into place in the groove 13 at the base of the plate, then the spring may be placed on the face side of the plate, as shown in Fig. 4. After the spring 12 is applied to the base of the plate (Fig. 3), it is, of course, necessary to slide the plate, on the pipe, into position against the floor or ceiling. Said spring 12 has sufficient tension to firmly secure the plate on the pipe, but permits of readily sliding the plate thereon.

Inasmuch as the retaining means is an endless flexible member, the plate may be applied and retained in places where other forms of plate could not be used. In Fig. 2, the plate is shown as cut away on one side to the bore of the sleeve or collar 10. The retaining means, however, due to its flexibility, conforms with and holds the plate segments securely in place on the pipe, as will be readily understood. In Fig. 1, the plate is shown fitted into a corner. In fact, the plate may be adapted to almost any place a pipe may be found. The plate may be made from wood or other material, which may be cut in different shapes, or may be made of iron, or other metals.

Changes in the specific form of my invention, as herein disclosed, may be made within the scope of what is claimed without departing from the spirit of my invention.

Having described my invention, what I claim as new and desire to protect by Letters Patent is:

1. A plate divided segmentally and including a sleeve and a dished flange thereon, said sleeve being grooved circumferentially and cupped at one end thereof by said flange, the segments of the plate being designed to be assembled around a pipe, and a flexible retaining member adapted to be coupled at its ends around the sleeve and within said groove for yieldingly, slidably gripping the plate segments in assembled relation upon said pipe.

2. A plate divided segmentally and including a sleeve and a dished flange, said sleeve having grooves therein, one on each side of the flange near its junction with the sleeve, one end of said sleeve being cupped by said flange, the segments of the plate being designed to be assembled around a pipe, and a flexible retaining member adapted to be coupled at its ends around the sleeve and within one of said grooves for holding the plate segments in assembled relation about the pipe.

In testimony whereof, I have signed my name to this specification.

EDWARD L. RIDLER.